United States Patent [19]

Smith

[11] 4,332,590
[45] Jun. 1, 1982

[54] REACTOR CONTROL

[75] Inventor: Dexter E. Smith, Bartlesville, Okla.

[73] Assignee: Phillips Petroleum Company, Bartlesville, Okla.

[21] Appl. No.: 236,345

[22] Filed: Feb. 20, 1981

[51] Int. Cl.³ .......................... G05D 11/02; C07B 1/00
[52] U.S. Cl. ................................ 23/230 A; 364/500; 422/62
[58] Field of Search ............... 23/230 A; 422/62, 110; 364/497, 500, 105

[56] References Cited

U.S. PATENT DOCUMENTS

| | | | |
|---|---|---|---|
| 3,135,277 | 6/1964 | Lupfer | 137/3 |
| 3,135,807 | 6/1964 | Grasselli et al. | 260/614 |
| 3,250,757 | 5/1966 | Smith et al. | 260/94.3 |
| 3,636,326 | 1/1972 | Smith et al. | 235/151.12 |
| 3,656,911 | 4/1972 | Hobbs | 422/62 |
| 3,721,253 | 3/1973 | Remke | 422/62 |
| 3,748,448 | 7/1973 | Sayles et al. | 235/151.12 |
| 3,864,346 | 2/1975 | Child et al. | 23/230 A |
| 3,871,831 | 3/1975 | Andral et al. | 23/230 A |

*Primary Examiner*—Ronald Serwin

[57] ABSTRACT

In a method and apparatus for control of a reaction system in which a plurality of feedstock-containing streams are combined to form a total reactor feed stream, the desired ratio of relative reactant concentrations and the total flow of feed material to a reaction zone are controlled in response to a total production rate set point signal and a reactant concentration set point signal. In addition, the temperature of material introduced into one or more reaction zones can be controlled in response to a conversion rate set point signal. The recycle flow of effluent around a reaction zone can also be controlled in response to a residence time set point signal.

16 Claims, 2 Drawing Figures

REACTOR CONTROL

This invention relates to control of a reactor. In one aspect, this invention relates to method and apparatus for controlling the ratio of the reactants in a feed stream flowing to the reactor. In another aspect, this invention relates to method and apparatus for controlling a reactor having a plurality of reaction zones. In yet another aspect, this invention relates to method and apparatus for controlling the production rate within a reaction system. In still another aspect, this invention relates to method and apparatus for controlling the conversion rate of a preselected feed component. In another aspect, this invention relates to method and apparatus for controlling the temperature of feed material to each of a plurality of reaction zones within a reactor system. In yet another aspect, this invention relates to method and apparatus for maintaining a desired reactant residence time within a reaction zone.

Many chemical processes utilize feed streams which are produced by some previous process and are often delivered directly from a process unit in the same or a nearby plant. Under such conditions, a particular desired feedstock constituent may be present in variable concentration due to process variations associated with its production. Regardless of such variations, it is desirable to maintain a controlled flow of the desired feed stream constituent to the process in which it will be used as a reactant. Control in such a manner is both more in need and more difficult where the desired reactant is present in a feed stream in relatively low concentration and/or is subject to wide variations in concentration.

It is thus an object of this invention to provide method and apparatus for controlling the ratio of the reactants in the feed stream flowing to a reactor.

Many chemical processes employ reaction systems which contain a plurality of reaction zones in series. It is therefore desirable to maintain dynamic control of the over-all reaction system to achieve desired conversion of feedstock to product and to maintain the conditions within each reaction zone at values which permit that zone to cooperate effectively in achieving the desired over-all process results.

It is therefore an object of this invention to provide method and apparatus for maintaining the desired temperature within and/or temperature drop across a reaction zone. Another object of the invention is to maintain a desired temperature relationship among a plurality of reaction zones within a reactor system. Yet another object of the invention is to provide a desired reactant residence time within a reaction zone.

Due to the complexity of many reaction systems and the complex dynamic interactions of process and control system variables, control of a substantial number of process variables is ordinarily necessary. In many cases, however, operating personnel responsible for the efficient operation of the process must deal individually with many of the controlled variables, quite often under circumstances in which the relationship of the control of many of the individual variables to the achievement of desired process end conditions is not readily apparent. It is therefore desirable to provide a control system in which operating personnel can achieve effective over-all process control by consideration and adjustment of a relatively small number of selected process conditions which bear a clear relationship to the desired process operating conditions and product characteristics.

It is therefore also an object of this invention to provide method and apparatus for controlling a reaction system in response to designation of a relatively few desired process conditions, each bearing a direct relationship to a basic process condition and/or product requirement.

In accordance with the present invention, there is provided a method and apparatus for control of a reaction system in which a plurality of feedstock-containing streams, at least one of which may be subject to variations in concentration of a desired feedstock constituent, are combined to form a combined total reactor feed stream. The desired ratio of relative reactant concentrations in the total feed to the reaction zone is maintained by controlling the flow of one or more streams having relatively stable reactant concentration in response to the measured concentration in the combined feed stream of at least one reactant which may be present in varying concentrations in the feed stream in which it is contained. The total flow rate of feed streams to the reaction zone is maintained at a level sufficient to meet a predetermined product production rate. The residence time in at least one reaction zone of the process is controlled by varying the flow rate of reaction zone effluent which is recycled to that reaction zone. In addition, a desired conversion rate of a preselected reactant to reaction product is maintained by controlling the temperature of the feed stream entering at least one reaction zone and by controlling the temperature differential across at least one reaction zone.

In the presently preferred embodiment of this invention, analysis of the combined feed stream to the process is used to generate signals representative of the concentration of at least one preselected reactant and of the ratio of this preselected reactant to one or more other reactants contained within the combined feed stream. The thus measured ratio of one preselected reactant to another is compared to a preselected desired ratio in order to generate a control signal which is used to regulate the flow of at least one feed stream to the reactor. The signal representative of the concentration of a preselected constituent in the total feed stream to the process is combined with signals responsive to the total feed flow to the process in order to produce a signal responsive to the total flow rate of that preselected constituent to the process. This total flow rate signal for the preselected reactant is then compared to a signal which is generated in response to either a fixed signal representative of the desired flow of that reactant to the process or, more preferably, to a target signal representative of the reactant flow rate needed to maintain a desired product production rate at the present measured conversion of the reactant in the process. This comparison results in a control signal which can be utilized to regulate the flow to the process of the feed stream containing the preselected reactant.

The residence time within a reaction zone of the process is controlled by generating a signal representative of the desired total rate of flow through the reaction zone required to give the desired residence time and by comparing this signal to a signal representative of the total fresh feed flow to the reaction zone in order to generate a signal representative of the amount of reaction zone effluent which should be recycled to the reaction zone in order to maintain the desired total flow rate through the reaction zone.

In an embodiment employing a plurality of reaction zones in a process, the percent conversion of a preselected process reactant is controlled by analyzing the process effluent to determine the amount of the preselected reactant which has not been converted to product and comparing a signal representative of the unreacted material leaving the process to a signal representative of the amount of material entering the process to produce a signal representative of the percent of that preselected reactant which was converted to product in the process. This conversion rate signal is then compared to a signal representative of the desired conversion rate to produce a control signal in response to which the temperature of the feed to at least one reaction zone of the process is regulated. In addition, a signal resulting from the comparison of the desired to actual conversion rate of the preselected reactant is used as a basis for control of the temperature differential across at least one reaction zone.

BRIEF DESCRIPTION OF THE DRAWINGS

Other objects and advantages of the invention will be apparent from the foregoing brief description of the invention from the claims as well as from the detailed description of the drawing in which:

Figure 1:
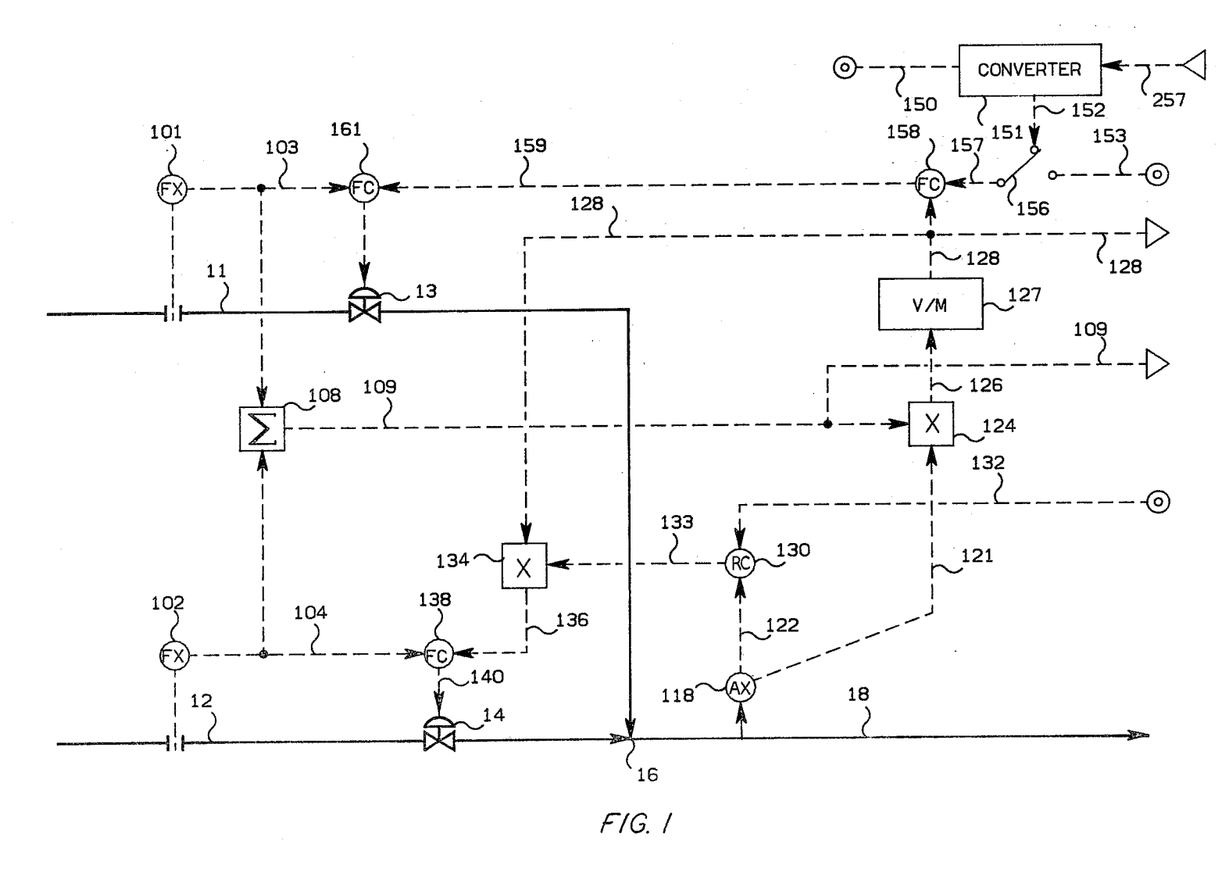
FIG. 1 is a schematic illustration of an apparatus for combining two feed streams including a control system associated therewith.
Figure 2:
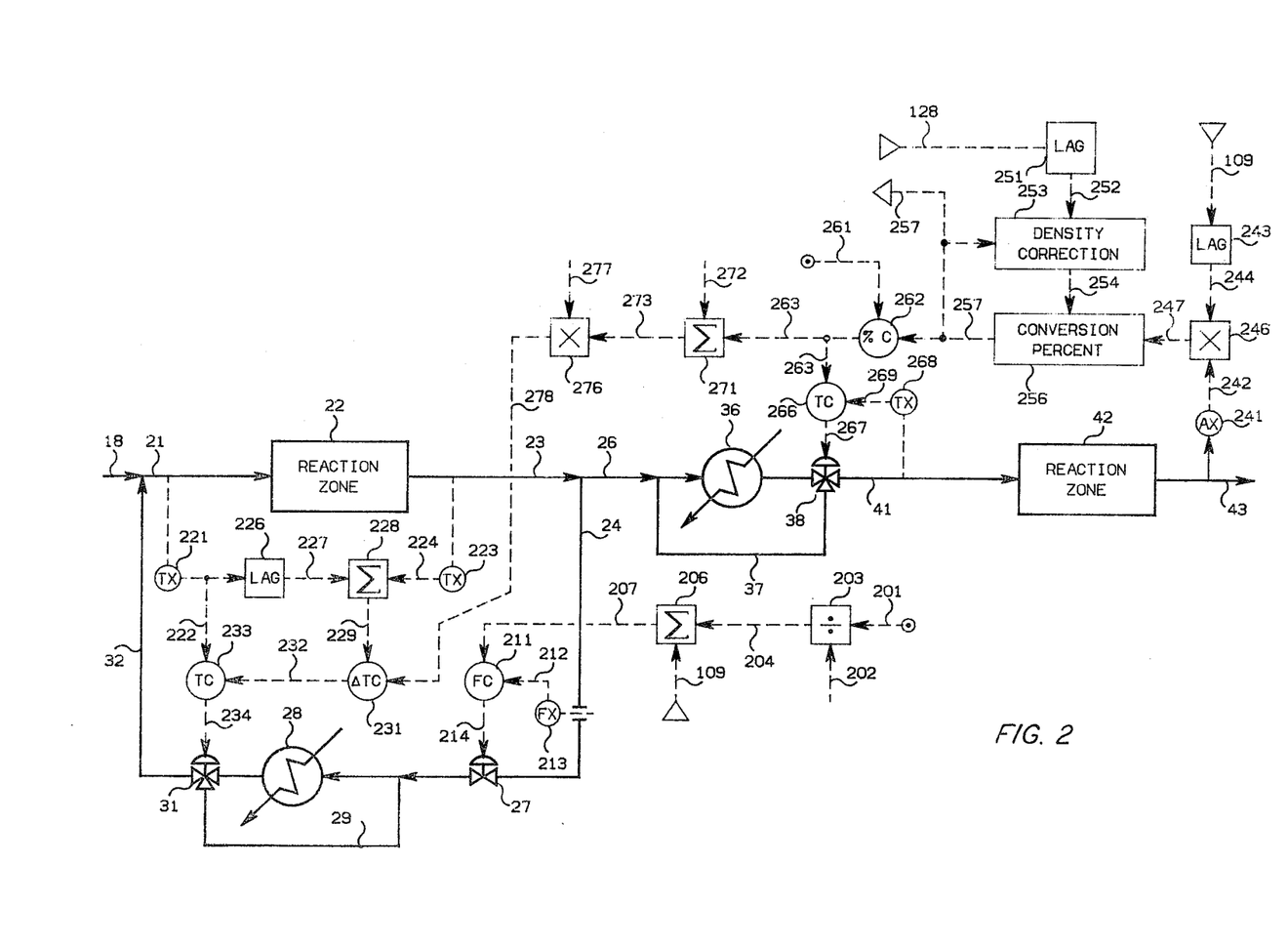
FIG. 2 is a schematic illustration of a reactor system employing two reaction zones in series as well as a control system associated therewith.

Together FIGS. 1 and 2 illustrate in schematic form a reactor system having two reactors in series and accepting a combined fresh feed stream from two feed stream sources along with an integrated control system for feed stream and process control.

The invention as described herein in terms of a process for producing methyl t-butyl ether. However, the invention is equally applicable to other chemical processes in which it is desirable to achieve the control of reactant ratio, total feed stream control, reaction zone temperature control, total production rate control, reactant conversion control, reaction zone residence time control, and/or other control functions of which the method and apparatus of the invention are capable. While the invention is described herein in terms of a reaction system having two reaction zones supplied by two feed streams, the apparatus and method of the invention are equally adaptable by those skilled in the art to systems employing different numbers of feedstreams and/or reaction zones.

Although the invention is illustrated and described in terms of a specific reactor system and a specific control system for the reactor, the invention is also applicable to different types and configurations which accomplish the purpose of the invention. Lines designated as signal lines in the drawings and shown as broken lines are electrical or pneumatic in this preferred embodiment. However, the invention is also applicable to mechanical, hydraulic or other signal means for transmitting information. In almost all control systems some combination of these types of signals will be used. However, use of any other type of signal transmission, compatible with the process and equipment in use is within the scope of the invention.

The controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where
 S = output control signal;
 E = difference between two input signals;
 $K_1$ and $K_2$ = constants.

The scaling of an output signal by a controller is well known in control systems art. Essentially, the output of a controller may be scaled to represent any desired factor or variable. An example of this is where a desired pressure and an actual pressure are compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 3 to 15 pounds/sq. in., which is typical, then the output signal could be scaled so that an output signal having a pressure of 9 pounds corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a first feed conduit means 11 having a flow control valve means 13 associated therewith and a second feed conduit means 12 having a flow control valve means 14 associated therewith. The conduit means 11 and 12 are adapted to provide flow of feedstock material through the associated valve means 13 and 14 to a junction point 16 where they combine to form a total fresh feed conduit means 18 for supplying fresh feed containing reactant materials to a process. Depending on the nature of the streams to be combined at the junction point 16, there may be located at the junction point 16 a mixing tee or other suitable mixing means to ensure that the material flowing through the conduit 18 is substantially homogeneous. In the preferred embodiment illustrated, the material carried by the conduit means 11 is a stream containing isobutylene such as, for example, a butane-butylenes stream from the gas plant of a fluid catalytic unit. In such a stream, the isobutylene content is often relatively low and may vary from time to time, particularly if the stream is received directly from the output of the fluid catalytic cracking unit. The feed material flowing through the conduit 12 is methanol which is delivered from bulk storage and is therefore not particularly subject to uncontrollable variations in overall composition or in methanol content.

Operably associated with each of the conduit means 11 and 12 is a respective flow transducing means 101, 102, each of which produces a respective flow rate signal 103, 104 representative of the volume flow rate of feed material through the conduit with which it is associated. A summing means 108 receives as inputs thereto the flow rate signals 103 and 104 and generates in response thereto a total fresh feed flow signal 109 representative of the total flow rate of material through conduit means 11 and 12.

Analysis transducer means 118 is adapted to take a sample of process fresh feed material from the conduit means 18 and to deliver in response to analysis of the sampled stream an isobutylene concentration signal 121 representative of the volume fraction of isobutylene in the fresh feed flowing through the conduit means 18 and a methanol/isobutylene ratio signal 122 representative of the ratio of methanol to isobutylene in the fresh feed material flowing through the conduit means 18.

A multiplying means 124 receives the isobutylene concentration signal 121 and total feed flow signal 109 and generates in response thereto an isobutylene feed flow signal 126 representative of the total volume flow rate of isobutylene to the reactor. In response to this volume isobutylene flow rate signal 126 a volume to mass conversion means 127 generates a mass isobutylene flow signal 128 representative of the mass flow rate of isobutylene through the conduit means 18.

A ratio controller means 130 receives the methanol/isobutylene ratio signal 122 and, in response to a comparison of signal 122 with a methanol/isobutylene concentration set point signal 132 generates a control signal 133 which can be considered as representative of a desired ratio of methanol-containing feed material entering the conduit means 18 from the conduit means 12 to total mass flow of isobutylene through the conduit means 18. A multiplying means 134 generates, in response to signals 133 and 128, a control set point signal 136 representative of the desired flow rate of material through the conduit 12. A flow controller means 138 generates, in response to a comparison of the flow rate set point signal 136 and the measured flow rate signal 104, a flow control signal 140 which can be used to adjust the position of the valve means 14 to maintain the desired flow rate of material through the conduit means 12.

A product production rate set point signal 150, in this case a signal representative of the desired production rate of methyl t-butyl ether, is provided to a converter means 151 to which is also provided a signal 257 representative of the percent of isobutylene converted to methyl t-butyl ether in the process (see FIG. 2) and produces in response thereto a target isobutylene feed set point signal 152. A switch means 156 is adapted to select as a set point signal 157 to a flow controller means 158 either the target isobutylene set point signal 152 generated in response to the methyl t-butyl ether production rate set point signal 150, or, in an alternative embodiment, an isobutylene feed set point signal 153. The flow controller means 158 generates a control signal 159 in response to the difference between the signal 157 representative of the desired isobutylene feed set point and the signal 128 representative of the measured mass flow of isobutylene to the reactor. The control signal 159 from the flow controller means 158 is then utilized in a cascade control system as the set point signal to a flow controller means 161 which generates a flow control signal 163 in response to the difference between the signal 159 and the signal 103 representative of the measured flow rate through the conduit 11. The control signal 163 is used to adjust the position of the valve means 13 and to thereby control the flow rate of isobutylene-containing feed material through the conduit means.

Referring now to FIG. 2, the conduit means 18 provides a flow of fresh feed material to a process inlet conduit means 21 which in turn conveys the material delivered thereto into a first reaction zone 22. Effluent from the reaction zone 22 is delivered by a conduit means 23 to a recycle conduit means 24 and to a second stage feed conduit means 26. The recycle conduit means 24 directs a portion of the effluent from the reaction zone 22 through a control valve means 27 to a heat exchange means 28 which is connected in parallel with the heat exchange bypass conduit 29. A control valve means 31 combines the streams flowing through the heat exchange means 28 and the heat exchange bypass conduit 29 and provides for communication of the combined streams with a recycle feed conduit means 32. The recycle feed conduit means 32 delivers a recycle feed stream to the conduit means 21 for reintroduction into the reaction zone 22.

The conduit means 26 delivers the material passing therethrough to a heat exchange means 36 and a heat exchange bypass conduit 37. A control valve means 38 delivers the combined flows through the heat exchange means 36 and heat exchange bypass conduit 37 through a second reaction zone 42 through a second reaction zone inlet conduit means 41. The finished product exits the reaction zone 42 through a process effluent conduit means 43.

A reaction zone residence time set point signal 201 representative of the desired residence time of fresh reactant material, from conduit 18, within the reaction zone 22 is provided, along with a signal 202 representative of the effective volume of the reaction zone 22, to a dividing means 203 which generates in response thereto a signal 204 representative of the total flow rate through the reaction zone required to provide the desired residence time within the reaction zone 22. A summing means 206 using the desired total flow signal 204 as a positive input thereto and the total fresh feed flow rate signal 109 as a negative input generates a difference signal 207 representative of the recycle flow rate required to combine with the fresh feed flow to achieve the desired reaction zone residence time for the fresh feed entering via conduit 18. Ths signal 207 is used as a set point signal to a flow controller means 211 which compares the signal 207 to a recycle flow rate signal 212 generated by a flow transducer means 213 and generates, in response to this comparison, a flow control signal 214 which is used to adjust the valve means 27 in order to obtain the desired recycle flow rate.

A temperature transducer 221 generates a signal 222 representative of the temperature of the material entering the reaction zone 22 through the conduit means 21. In a similar manner, a temperature transducer 223 generates a temperature signal 224 representative of the temperature of material exiting the reaction zone 22 through the conduit means 23. The temperature signal 222 is received by a lag means 226 which delivers in response thereto a lagged temperature signal 227. The lag means 226 is adapted by means known in the art to adjust the temperature signal 222 to compensate for process dynamic conditions associated with the reaction zone 22 and to create a lagged temperature signal 227 which can be meaningfully combined by a summing means 228 which accepts signal 227 as a negative input thereto and signal 224 as a positive input thereto in order to generate a temperature differential signal 229 representative of the temperature rise between the reaction zone inlet and outlet for exothermic reaction processes.

An analyzer transducer means 241 generates, in response to analysis of the material within the conduit means 43, a signal 242 representative of the volume percent of isobutylene present in the effluent from the reaction zone 42. Total feed flow signal 109 is supplied to a lag means 243 to produce a lagged total feed flow signal 244. While use of a lag means 243 is nonetheless still preferred to provide signal conditioning and eliminate signal noise, in many applications the need for its delay characteristics will be minimal due to the flow characteristics inherent in the reaction system which cause inlet flow and effluent flow to be the same under normal conditions. Where the reactor system has the capability to substantially build or reduce inventory, however, the lag means will preferably also impart time delay characteristics to the signal. A multiplier means 246 accepts the lagged total feed flow signal 244 and the percent unreacted isobutylene signal 242 and produces in response thereto a signal 247 representative of the total isobutylene leaving the reactor.

Signal 128 representative of the mass flow of isobutylene to the process is provided to a lag means (preferably second order or higher) 251 which provides a lag compensated isobutylene mass flow signal 252 to a density correction means 253. The lag and density corrected total isobutylene feed signal 254 delivered by the density correction means 253 is provided, along with the signal 247 representative of the total isobutylene leaving the reactor to a conversion percent generating means 256. Using signals 247 and 254 representative of unreacted isobutylene leaving the process and isobutylene entering the process respectively, the conversion percent generating means 256 provides a signal 257 representative of the percentage of isobutylene which is converted to methyl t-butyl ether in the process. Signal 257 is provided as additional compensating feedback input to the density correction means 253.

A percentage isobutylene conversion set point signal 261 representative of the desired isobutylene conversion performance of the process is provided to a percentage conversion controller means 262 as a set point signal. In response to the comparison of the set point signal 261 with the percentage conversion signal 257, the percentage conversion controller means 262 provides an output control signal 263. The control signal 263 is used as a set point signal to a temperature controller means 266 which generates a temperature control signal 267 in response to a comparison of the set point signal 263 with a temperature signal 269. The temperature signal 269 is generated by a temperature transducer 268 and is representative of the temperature of material flowing to the second reaction zone 42 through the conduit means 41. The temperature control signal 267 is used to adjust the position of the valve means 38 thereby varying the relative amounts of material passing through the heat exchange means 36 and bypassing the heat exchange means 36 through the bypass conduit 37 in order to maintain the temperature of the material flowing through the conduit 41 at the temperature represented by the signal 263.

A summation means 271 applies a bias signal 272 to control signal 263 in order to produce a biased control signal 273. The biased control signal 273 is thereafter acted upon by a multiplier means 276 which applies a gain signal 277 thereto to produce a scaled, biased control signal 278. The bias and scaling factors incorporate into the control signal 263 factors compensating for the characteristics and dynamics of the process relationship between the first reaction zone 22 and the second reaction zone 42 in order to provide a signal 278 which is used as a set point signal to a temperature differential controller means 231. In response to a comparison of the measured temperature differential signal 229 and the control set point signal 278, the differential temperature controller 231 provides an output control signal 232 as a set point signal to a temperature controller means 233. In reponse to a comparison of the controlled set point signal 232 with the temperature signal 222 representative of the temperature of material entering the reaction zone 22 through the conduit means 21, the temperature controller means 233 produces an output control signal 234. The control signal 234 is operably associated with the valve means 31 for controlling the relative amounts of material passing through the heat exchange means 28 and around the heat exchange means 28 through the bypass conduit means 29 in order to maintain the temperature of material flowing through the conduit means 21 to the reaction zone 22 at a temperature which causes the temperature signal 222 to be equal to the control signal set point 232.

As can be seen from the above description of the preferred embodiment of the invention, a process such as a methyl t-butyl ether production process can be controlled in accordance with the apparatus and method of the invention by manipulation of relatively few set point entries into the system. In addition, each set point which must be entered into the system can be expressed in terms of a process result with which the operating personnel are familiar. In the preferred application to a methyl t-butyl ether process as illustrated, four set point signals—methyl t-butyl ether production rate set point signal 150, methanol/isobutylene feed ratio of set point signal 132, first reaction zone residence time set point signal 201, and isobutylene percent conversion set point signal 261—are provided as operator entries into the control system and, in response to these four operator entries, the flow rates of both inlet feed streams, the flow rate of the recycle stream to the first reaction zone, the temperature of the recycle stream to the first reaction zone, and the temperature of the inlet stream to the second reaction zone are controlled.

Once the four set point signals have been established, the flow rate of the stream containing a first reactant material through the conduit means 11 is controlled in response to signals representative of the amount of the first reactant material in the total fresh feed to the reactor system, the total flow of feed material to the reactor system, the amount of unreacted first reactor material leaving the reactor system, and the production rate set point. More specifically, the analysis of the first reactant concentration in the fresh feed to the reactor system and the measurement of total flow of first feed to the reactor system are used to produce a signal representative of the total amount of the first reactant being provided to the reactor system.

In a similar manner analysis of the effluent from the reactor system to determine the amount of unreacted first reactant present is used in combination with the total flow of feed material to the reactor system to determine the total amount of unreacted first reactant which is leaving the reactor system (assuming that, as in the presently preferred embodiment, the reactor system is not subject to variations which will prohibit the use of total feed flow as a value which has an approximately constant relationship to total product stream flow). Signals representative of the total amount of the first reactant entering the system and the total amount of first reactant leaving the system are then compared to provide a signal equal to the proportion of first reactor material which is converted to product in the reactor system. This conversion ratio signal is then converted to a target first reactant flow set point representative of the amount of first reactant required to be provided to the reactor system to produce the desired product of reaction at the rate represented by the process production rate set point signal. This generated target first reactant set point signal is then compared to the measured flow of the first reactant to the reactor system and the flow of the first feed stream containing the first reactant is controlled in response to that comparison. Signals representative of flow rates of materials such as the first reactant in the system can be represented in either volume flow rate or mass flow rate units. In general, volume flow rate units are more closely related to the unprocessed signals delivered by the various transducers employed in implementing the control system, but conversions to mass flow rate and representation of such signals in mass flow rate units can also be used. In the presently preferred embodiment, for example, a measured volume flow rate of the first reactant to the reactor system is converted to a mass flow rate in order to provide convenient comparison with a target first reactant set point signal which is generated in response to a product production rate set point which is more conveniently entered by the operator in mass flow units.

The flow of the second stream containing a second reactant material is controlled in the presently preferred embodiment in response to the relative proportion of first and second reactant materials in the total fresh feed flow to the reactor. A set point signal representative of the desired proportion of first and second reactant materials to be supplied to the reactor system and the measured total flow of the first reactant material to the reactor system. In particular, the measured proportion of first and second reactant materials flowing to the reactor system is compared to the desired proportion represented by the set point signal, and the controller output generated in response to this comparison is multiplied by the measured flow rate of first reactant material to the reactor system in order to generate a set point signal representative of the desired flow rate of material through the second feed stream required to achieve the desired reactant ratio.

In order to control the percent conversion of first reactant material to produce in the reactor system, the measured conversion rate is compared to a conversion rate set point signal and, in response to this comparison, a controller produces a temperature set point signal representative of the desired temperature of material entering a second reaction zone within the reactor system. Since the relationship among the desired inlet temperatures and temperature differentials across various reaction zones within a reactor system often bear a known relationship to each other, this same controller-produced temperature set point signal can, as in the preferred embodiment of the invention, be appropriately scaled and biased in order to provide a temperature differential set point signal appropriate for control of the temperature differential across and desired inlet temperature to a first reaction zone upstream of the second reaction zone.

Since the production of certain reactor products and byproducts is often a direct result of the residence time within one or more reaction zones of a reactor system, the desired residence time within the first reaction zone of the preferred embodiment is provided as a set point. The reactor volume (which in most systems will be a constant but which can be a variable signal if the effective reactor volume is dependent upon reactor or feedstock conditions) is divided by the residence time set point to provide a signal representative of the desired total flow rate through the reaction zone required to achieve the desired residence time. By deducting the calculated fresh feed flow rate from the desired total flow rate signal, a set point signal is generated which is representative of the recycle flow rate to the reaction zone required to maintain the desired reaction zone residence time.

The invention has been described in terms of a presently preferred embodiment as illustrated in FIGS. 1 and 2. Specific components which can be used in the practice of the invention as illustrated in FIGS. 1 and 2 such as flow transducers 101, 102 and 103; temperature transducers 221, 222 and 268; controllers 130, 138, 158, 161, 211, 231, 233, 262 and 266; summing means 108, 206, 228 and 271, multiplier means 124, 134, 246 and 276; dividing means 203; and lag means 226, 243 and 251 are each well known, commercially available control components such as are described at length in Perry's

*Chemical Engineers' Handbook,* Fourth Edition, Chapter 22, McGraw-Hill.

The volume to mass flow conversion means 127 can be any suitable means for converting a volume flow to a mass flow rate signal. The relationships between volume and mass for various materials are well known physical properties. Since such relationships may vary with varying ambient conditions there may be a need in some applications to provide a correcting factor signal input to such a conversion means. For example, under circumstances where the temperature of a liquid stream is normally substantially constant, application of a simple conversion factor to the volume flow signal will produce a suitable mass flow signal. If, however, the temperature of the stream is subject to variation, the known temperature/volume relationship of the material can be used as a correcting factor in the conversion from volume flow rate to mass flow chart.

Although the converter means 151 can be adapted to provide a more complex relationship between the input signals 150 and 257 and the output signal 152, the presently preferred embodiment for this converter means 151 is that of a simple divider which divides the desired production rate of MTBE in mass units such as pounds per hour by a conversion signal representative of the measured rate at which a preselected component is converted to product in the process to arrive at a target pound per hour value for the flow rate of that preselected material to the process.

The density correction means 253 can be any suitable means for converting the mass flow rate signal 128 to a signal which will serve as a useful input to the conversion percent means 256. In the illustrated embodiment such a density correction means can be essentially the inverse of the volume/mass conversion means 127. More preferably, it will comprise means for correcting the lagged mass flow rate signal 252 in response to a known relationship between the density of product (MTBE) and feedstock in view of the measured conversion percent signal 257 indicative of the proportion of product and feedstock present in the effluent stream 43. For any particular feedstock composition, the density relationship between the feedstock and the product can be determined by means well known in the art. Such a relationship can be utilized either as a constant relationship or can be varied in response to changes in feedstock composition.

The conversion percent means 256 can be any suitable means for producing a conversion signal 257 in response to signals 247 and 254. The presently preferred embodiment comprises means for subtracting the signal 247 from the signal 254 to arrive at an intermediate signal representative of the amount of isobutylene converted to MTBE, then dividing this intermediate signal by the signal 254 to produce a signal representative of the fraction of isobutylene converted to MTBE. This conversion signal can then be scaled to produce a percentage signal 257 or other appropriate signal representative of conversion percent or rate.

Analyzer transducers 118 and 241 are preferably chromatographic analyzers such as the Model 102 Process Chromatograph System, manufactured by Applied Automation, Incorporated, Bartlesville, Okla. For reasons of brevity, conventional auxiliary equipment, such as pumps, additional heat exchangers, additional measurement-control devices, transducing elements inherent in the implementation of a control system utilizing mixed pneumatic/analog electrical/digital electronic control systems, etc., have not been included in the above description as they are well known by those skilled in the art in the implementation of control systems such as the one described herein and as such play no additional part in the explanation of the invention. The presently preferred embodiment of the invention can be suitably implemented using analog electric signal generation means in combination with pneumatically actuated valve control means or, where available, digital electronic control means or a combination of digital electronic and electrical analog signal generation means in combination with pneumatically actuated control valves.

While the invention has been described in terms of the presently preferred embodiment, reasonable variations and modifications are possible by those skilled in the art within the scope of the described invention and the appended claims thereto. Variations such as use of the control system of the present invention in different processes or in conjunction with reactor systems which contain more or fewer reaction zones is within the scope of the invention.

That which is claimed is:

1. Apparatus comprising:

reactor means, feed means for conveying reactant materials to said reactor means, said feed means comprising first conduit means for delivering a first stream containing a first reactant material and second conduit means for delivering a second stream containing a second reactant material, product conduit means for receiving product-containing effluent from said reactor means, first flow control means for controlling the flow of material through said first conduit means in response to a first stream control signal, first analyzer means operably associated with said feed means for producing a first analysis signal representative of the amount of said first reactant material in the combined first stream and second stream of said feed means second analyzer means operably associated with said product conduit means for producing a second analysis signal representative of the amount of said first reactant material within said product-containing effluent, means for generating a total feed flow signal representative of the total flow of said first stream and said second stream to said reactor means, means for generating, in response to said first analysis signal, said second analysis signal and said total feed flow signal, a process conversion signal representative of the proportion of said first reactant material converted to reaction product within said reactor means, means for generating, in response to said first analysis signal and said total feed flow signal, a first reactant flow signal representative of the flow rate of said first reactant to said reactor means through said feed means, and means for generating said first stream control signal in response to said process conversion signal, said first reaction flow signal and a production rate set point signal representative of a preselected rate at which product is to be produced in said reactor means.

2. Apparatus in accordance with claim 1 initially comprising:

means for producing a third analysis signal representative of the relative proportion of said second reactant material and said first reactant material in the combined first stream and second stream of said feed means, and means for generating said second stream control signal in response to said total feed flow signal, said third analysis signal and a reactant ratio set point signal representative of a preselected relative proportion of said second reactant material and said first reactant material to be provided by the combined first stream and second stream of said feed means.

3. Apparatus in accordance with claim 1 wherein said reactor means comprises means for defining first and second reaction zones and intermediate conduit means for delivering at least a first portion of the effluent from said first reaction zone to said second reaction zone, said apparatus additionally comprising:

first temperature control means for controlling, in response to a first temperature control signal, the temperature of said at least a first portion of the first reaction zone effluent delivered to said second reaction zone, second temperature control means for controlling, in response to a second temperature control signal, the temperature differential between material entering said first reaction zone and material leaving said first reaction zone by adjusting the temperature of the material entering said first reaction zone, and means for generating said first temperature control signal and said second temperature control signal in response to comparison of said process conversion signal with a process conversion set point signal representative of a preselected proportion of said first reactor material to be converted to reaction product within said reactor means.

4. Apparatus in accordance with claim 3 additionally comprising:

means for producing a third analysis signal representative of the ratio of said second reactant material to said first reactant material in the combined first stream and second stream of said feed means, and means for generating said second stream control signal in response to said total feed flow signal, said third analysis signal and a reactant ratio set point signal representative of a preselected ratio of said second reactant material to said first reactant material to be provided by the combined first stream and second stream of said feed means.

5. Apparatus in accordance with claim 3 additionally comprising:

recycle conduit means for delivering a second portion of the effluent from said first reaction zone to the inlet of said first reaction zone as a recycle stream, third flow control means for controlling the flow of material through said recycle conduit means in response to a recycle stream control signal, and means for generating said recycle stream control signal in response to said total feed flow signal and a residence time set point signal representative of a preselected residence time to be maintained within said first reaction zone.

6. Apparatus in accordance with claim 4 additionally comprising:

means for producing a third analysis signal representative of the ratio of said second reactant material to said first reactant material in the combined first stream and second stream of said feed means, and means for generating said second stream control signal in response to said total feed flow signal, said third analysis signal and a reactant ratio set point signal representative of a preselected ratio of said second reactant material to said first reactant material to be provided by the combined first stream and second stream of said feed means.

7. Apparatus in accordance with claim 5 wherein said second temperature control means comprises means for controlling the temperature of said recycle stream.

8. Apparatus in accordance with claims 1, 2, 3, 4, 5, 6 or 7 wherein said means for generating said first stream control signal comprises:

means for generating a target first reactant flow set point signal in response to said process conversion signal and said production rate set point signal, and means for comparing said first reactant flow set point signal with said first reactant flow signal and producing said first stream control signal in response thereto.

9. A method comprising:

providing a first stream containing a first reactant material, providing a second stream containing a second reactor material, combining said first stream and said second stream to form a fresh feed stream, delivering said fresh feed stream to a reactor system, removing a product-containing stream from said reactor system, generating a first analysis signal representative of the amount of said first reactant material in said fresh feed stream, generating a second analysis signal representative of the amount of said first reactant material in said product-containing stream, generating a fresh feed flow signal representative of the total combined flow of said first stream and said second stream, generating a process conversion signal, representative of the proportion of said first reactor material converted to product within said reactor system, in response to said first analysis signal, said second analysis signal and said fresh feed flow signal generating a first reactant flow signal, representative of the flow of said first reactor material to said reactor system, in response to said first analysis signal and said fresh feed flow signal, and controlling the flow rate of said first stream in response to said process conversion signal, said first reactant flow signal and a production rate set point signal representative of a preselected rate at which product material is to be produced from said first and second reaction materials within said reactor system.

10. A method in accordance with claim 9 additionally comprising:

generating a third analysis signal representative of the relative proportions of said first reactant material and said second reactant material within said fresh feed stream, and controlling the flow rate of said second stream in response to said fresh feed flow signal, said third analysis signal and a reactant ratio set point signal representative of the relative proportion of said first reactant material and said second reactant material to be provided to said reactor system by said fresh feed stream.

11. A method in accordance with claim 9 additionally comprising:

providing, within said reactor system, a first reaction zone and a second reaction zone wherein at least a first portion of the effluent from said first reaction zone is delivered to said second reaction zone as an intermediate stream, generating a first temperature control signal in response to comparison of said process conversion signal with a process conversion set point signal representative of a preselected proportion of said first reactant material to be converted to product within said reactor system, and controlling the temperature of said intermediate stream in response to said first temperature control signal.

12. A method in accordance with claim 11 additionally comprising:

generating a third analysis signal representative of the relative proportions of said first reactant material and said second reactant material within said fresh feed stream, and controlling the flow rate of said second stream in response to said fresh feed flow signal, said third analysis signal and a reactant ratio set point signal representative of the relative proportion of said first reactant material and said second reactant material to be provided to said reactor system by said fresh feed stream.

13. A method in accordance with claim 11 additionally comprising:

providing a recycle stream for delivering a second portion of the effluent from said first reaction zone to said first reaction zone by combining said recycle stream with said fresh feed stream, and controlling the temperature differential across the first reaction zone and the temperature of said recycle stream combined with said feed stream in response to said first temperature control signal.

14. A method in accordance with claim 13 additionally comprising providing a preselected residence time within said first reaction zone by controlling the flow of said recycle stream in response to said fresh feed flow signal and the residence time set point signal representative of a preselected residence time to be maintained in said first reaction zone.

15. A method in accordance with claim 14 additionally comprising:

generating a third analysis signal representative of the relative proportions of said first reactant material and said second reactant material within said fresh feed stream, and controlling the flow rate of said second stream in response to said fresh feed flow signal, said third analysis signal and a reactant ratio set point signal representative of the relative proportion of said first reactant material and said second reactant material to be provided to said reactor system by said fresh feed stream.

16. A method in accordance with claim 9, 10, 11, 12, 13, 14 or 15 wherein controlling the flow rate of said first stream comprises:

generating a target first reactant flow set point signal in response to said process conversion signal and said production rate set point signal, and controlling the flow rate of said first stream in response to comparison of said target first reactant flow set point signal with said first reactant flow signal.

* * * * *